(12) United States Patent
Chen et al.

(10) Patent No.: US 8,600,039 B2
(45) Date of Patent: Dec. 3, 2013

(54) SYSTEM FOR LOW COMPLEXITY ADAPTIVE ECHO AND NEXT CANCELLERS

(75) Inventors: Jie Chen, San Jose, CA (US); Keshab K. Parhi, Maple Grove, MN (US)

(73) Assignee: Leanics Corporation, Maple Grove, MN (US)

( * ) Notice: Subject to any disclaimer, the term of this patent is extended or adjusted under 35 U.S.C. 154(b) by 257 days.

(21) Appl. No.: 12/806,539

(22) Filed: Aug. 16, 2010

(65) Prior Publication Data

US 2011/0044448 A1 Feb. 24, 2011

Related U.S. Application Data

(60) Provisional application No. 61/274,902, filed on Aug. 24, 2009.

(51) Int. Cl.
*H04M 9/08* (2006.01)
(52) U.S. Cl.
USPC .............. 379/406.09; 379/406.1; 379/406.11; 379/406.13; 379/406.14
(58) Field of Classification Search
USPC ........................ 379/406.01–406.16
See application file for complete search history.

(56) References Cited

U.S. PATENT DOCUMENTS

| | | | | |
|---|---|---|---|---|
| 6,400,761 | B1* | 6/2002 | Smee et al. | 375/232 |
| 8,009,823 | B2* | 8/2011 | Parhi et al. | 379/390.02 |
| 2003/0086515 | A1* | 5/2003 | Trans et al. | 375/346 |
| 2003/0223505 | A1* | 12/2003 | Verbin et al. | 375/261 |
| 2004/0125973 | A1* | 7/2004 | Fang et al. | 381/318 |
| 2006/0056521 | A1* | 3/2006 | Parhi et al. | 375/242 |

\* cited by examiner

*Primary Examiner* — Duc Nguyen
*Assistant Examiner* — Yosef K. Laekemariam

(57) ABSTRACT

The present invention relates to design and implementation of low complexity adaptive echo and NEXT cancellers in multi-channel data transmission systems. In this invention, a highly efficient weight update scheme is proposed to reduce the computational cost of the weight update part in adaptive echo and NEXT cancellers. Based on the proposed scheme, the hardware complexity of the weight update part can be further reduced by applying the word-length reduction technique. The proposed scheme is general and suitable for real applications such as design of a low complexity transceiver in 10GBase-T. Different with prior work, this invention considers the complexity reduction in weight update part of the adaptive filters such that the overall complexity of these adaptive cancellers can be significantly reduced.

39 Claims, 12 Drawing Sheets

SYSTEM FOR LOW COMPLEXITY ADAPTIVE ECHO AND NEXT CANCELLERS

CROSS-REFERENCE TO RELATED APPLICATIONS

This application claims the benefit of U.S. Provisional Application No. 61/274,902, filed on Aug. 24, 2009, the entire content of which is incorporated herein by reference in its entirety.

FIELD OF THE INVENTION

The present invention relates to digital signal processing and transmission in wire-lined communication systems. More specifically, it relates to low complexity designs of adaptive echo and near-end crosstalk (NEXT) cancellers in multi-channel DSP transceivers with Tomlinson-Harashima precoders.

BACKGROUND OF THE INVENTION

Many multi-channel wire-line communication systems, such as DSL (digital subscribe line) systems and gigabit Ethernet systems suffer from echo and cross channel interferences, i.e., crosstalks. Generally, echo and NEXT cancellers are used to mitigate the effect of echo and NEXT noise. The typical way to implement those noise cancellers is to use finite impulse response (FIR) filters in digital domain. This straightforward approach, however, will lead to a significant hardware complexity if the number of taps in the FIR filters is large. For example, in the typical 10GBase-T application, one echo canceller and three NEXT cancellers are used for each pair of cables. Since there are four pairs of cables (four channels) in 10GBASE-T, a total of four echo cancellers and twelve NEXT cancellers are needed at the receiver end. To achieve high performance noise cancellation, each FIR based echo and NEXT canceller requires hundreds of taps, and then the total number of taps in these cancellers is around 5600~6800. Furthermore, all these cancellers need to be adapted to accommodate channel variations. Implementing these adaptive cancellers will consume large silicon area and power consumption. Therefore, efficient implementation of these adaptive cancellers is very important for a successful DSP transceiver design.

How to achieve a cost-effective design of adaptive echo and NEXT cancellers in multi-channel DSP transceivers is a challenging task. It is apparent in the industry that the FIR techniques used in 1000Base-T solutions, if implemented in a straightforward way, would result in a complexity increase on the order of 45× over 1000Base-T. By using FFT transformation, approximate complexity saving can be 90%. However, new issues such as block processing latency, increased memory and increased precision, make it unsuitable for the multi-channel wire-line data transmission systems such as 10GBase-T. Because of the inherent time-varying and randomness of the channel impulse responses, simple techniques to extend the length of the impulse response to be cancelled, such as continuous-time analog filters or infinite impulse response (IIR) digital filters are not acceptable as flexible solutions. The problem becomes even worse when introducing Tomlinson-Harashima precoding (TH precoding) in 10GBase-T as the inputs to echo and NEXT cancellers are no longer simple PAM-M symbols but numbers uniformly distributed on [−M, M]. These make look-ahead and pre-computation techniques difficult to apply (See, e.g., K. K. Parhi, "Pipelining of Parallel Multiplexer Loops and Decision Feedback Equalizers," in *Proceedings of ICASSP* 2004, vol. 5, pp. 21-24, May 2004). Furthermore, the word-length of these inputs needs to be long enough (i.e., 10-bit) to achieve required noise cancellation level. Thus, the implementation cost of these adaptive echo and NEXT cancellers increases significantly.

To solve these problems, a new word-length reduction scheme was proposed in one of previous inventions (See, Keshab K. Parhi, and Yongru Gu, "System and method for low-power echo and NEXT cancellers", U.S. patent application Ser. No. 11/487,041, filed on Jul. 13, 2006), where the hardware cost of these echo and NEXT cancellers was reduced by about 10.82% without any performance loss. However, the proposed word-length reduction technique can not be easily applied to the weight (coefficient) adaptation part in the adaptive filters. Complexity analysis also showed that the hardware cost saving was mainly due to hardware cost reduction of the filter part in these adaptive cancellers. Therefore, the problem of reducing hardware cost of the weight update part in these adaptive cancellers remained unsolved.

What is needed is a new design methodology and an implementation method to deal with the weight update part in these adaptive echo and NEXT cancellers so that the overall hardware cost of implementing these cancellers can be further reduced.

BRIEF SUMMARY OF THE INVENTION

The present invention proposes a new complexity reduction scheme for the weight update part in adaptive echo and NEXT cancellers, and also describes a high-speed implementation method for the proposed low complexity adaptive echo and NEXT cancellers in a multi-channel data transmission system with TH precoding.

In accordance with the present invention, the overall hardware cost reduction in adaptive echo and NEXT canceller is achieved by incorporating both word-length reduction scheme and the proposed weight update scheme. First, the retiming technique is applied to obtain a filtered error LMS architecture (See, e.g., S. Shaffer and C. S. Williams, "The Filtered Error LMS Algorithm," in *Proceedings of ICASSP* 1983, vol. 8, pp. 41-44, April 1983), such that the inputs to both filter part and weight update part can then be replaced by a finite signal, v(n). Applying the word-length reduction scheme (See, e.g., J. Chen, Y. Gu and K. K. Parhi, "Low Complexity ECHO And NEXT Cancellers for High-Speed Ethernet Transceivers", in *IEEE Trans. Circuits and Systems-I: Regular Papers*, 55(9), pp. 2827-2840, October 2008), the overall hardware cost of these cancellers can be reduced. Moreover, an efficient weight-updating scheme is proposed by exploiting the property of the sum of two adaptive filters to further reduce the overall computational complexity. The proposed scheme is general and can be applied to multiple-input-multiple-output (MIMO) systems such that hardware cost of both echo and NEXT cancellers can be reduced in a typical 10GBase-T Ethernet system.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The present invention is described with reference to the accompanying figures. The accompanying figure, which are incorporated herein, form part of the specification, illustrate the present invention and, together with the description, further serve to explain the principles of the invention and to enable a person skilled in the relevant art to make and use the invention.

Table 1 lists the performance comparison for different designs in terms of residual error signal power at the input to the FFE.

Table 2 lists the hardware complexity comparison of the resulting adaptive echo and NEXT cancellers by applying different architectures.

DETAILED DESCRIPTION OF THE INVENTION

Background on Adaptive Echo and NEXT Cancellers in 10GBase-T

Recently, TH precoding has been proposed to be used in 10GBase-T because it can eliminate error propagation and allow use of capacity-achieving channel codes, such as low-density parity-check (LDPC) codes, in a natural way. However, the use of TH precoding technology significantly increases the complexity of adaptive echo and NEXT cancellers in 10GBase-T.

Figure 1:
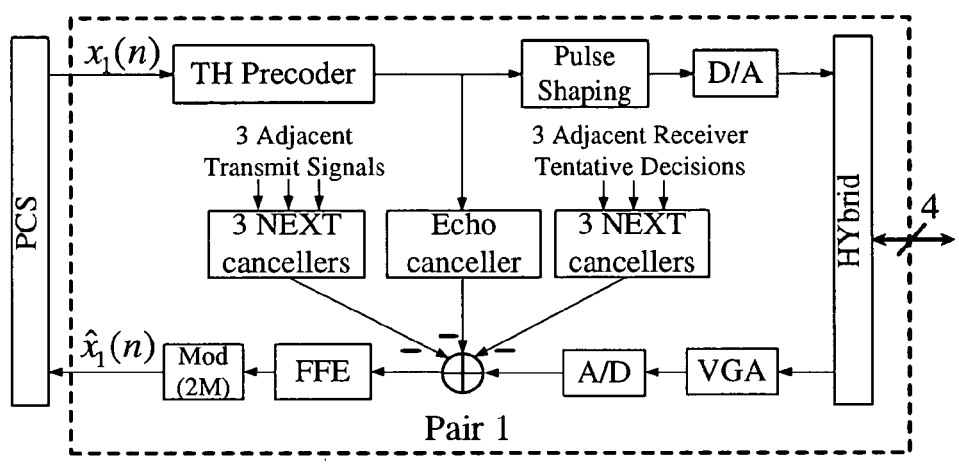
FIG. 1 illustrates the block diagram of a typical 10GBase-T transceiver for one pair, where one echo and three NEXT cancellers are needed for each of four channels (or four pairs).
Figure 2:
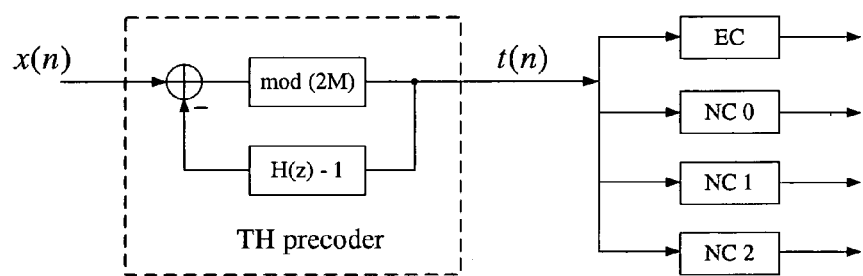
FIG. 2 illustrates the input signal to the echo and NEXT cancellers in traditional method.

Consider the block diagram of a typical 10GBase-T transceiver for one pair in FIG. 1, where one echo and three NEXT cancellers are needed for each of four channels (or four pairs). These cancellers are usually implemented using adaptive FIR filters. In a straightforward design, the input to these echo and NEXT cancellers comes from the output signal of the TH precoder associated with the same pair, i.e., the signal t(n) is used as the input to these cancellers, as shown in FIG. 2, where EC denotes echo canceller and NC denotes NEXT canceller. The problem associated with the design in FIG. 2 is that the wordlength of the signal, t(n), could be as long as 10 bits due to the use of TH precoding. While without TH precoding, x(n), a PAM-16 (16-level pulse amplitude modulation) signal of length only 4 bits, is used as the input signal to these adaptive cancellers. Therefore, word-length increase due to the precoding in 10GBase-T significantly increases the complexity of the multipliers in echo and NEXT cancellers. Since these adaptive cancellers are the largest blocks in the DSP transceiver, it is important to develop techniques to design echo and NEXT cancellers with low complexity and low power.

Figure 3:
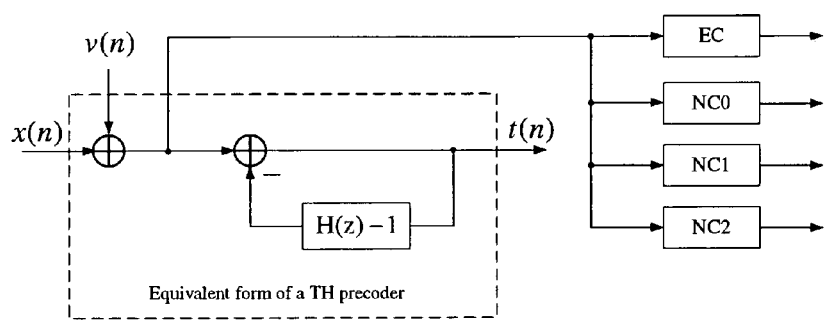
FIG. 3 illustrates the input signal to the echo and NEXT cancellers in proposed method.

Previous Invention on Low Complexity Adaptive Echo and NEXT Cancellers in 10Gbase-T To reduce the complexity of echo and NEXT cancellers, a method based on word-length reduction technique was proposed in one of previous inventions (See, Keshab K. Parhi, and Yongru Gu, "System and method for low-power echo and NEXT cancellers", U.S. patent application Ser. No. 11/487, 041, filed on Jul. 13, 2006). The proposed design was derived from converting a TH precoder to its equivalent form where the TH precoder could be viewed as an infinite impulse response (IIR) filter $$\frac{1}{H(z)}$$

with an input equal to the sum of the original input to the TH precoder x(n) and a finite-level compensation signal v(n). Instead of using the output of the TH precoder t(n) as the input to the echo and NEXT cancellers, the sum signal x(n)+v(n) was proposed to be the input to these cancellers, as shown in FIG. 3. Based on the fact that this sum signal has finite levels, it can be encoded to have fewer bits than the original input t(n). Hence, the overall complexity can be reduced by applying the word-length reduction technique. By exploiting the statistical properties of the compensation signal v(n), further complexity reduction of these cancellers could be achieved.

In real applications, echo and NEXT channels are slowly-varying and adaptive filters are needed for noise cancellation. The prior word-length reduction technique can also be applied to the design of these adaptive cancellers. In the following, we only consider adaptive echo cancellers to illustrate the design methodology since the architecture of NEXT cancellers is similar to that of echo cancellers except that the inputs are replaced by the transmitted signals from the adjacent transmitters.

Figure 4:
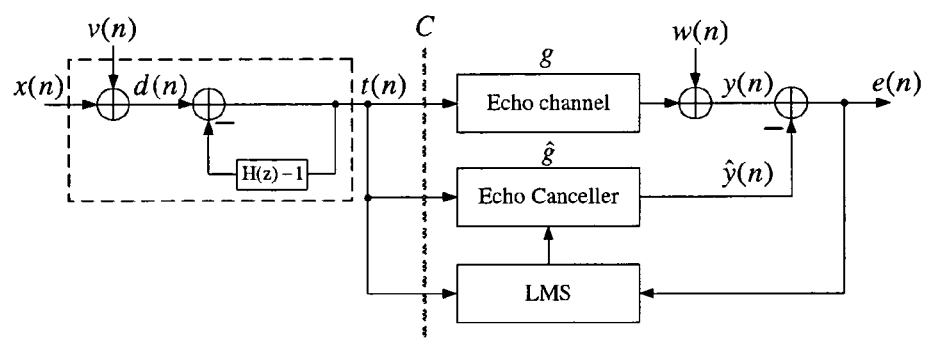
FIG. 4 illustrates an example of designing an adaptive echo canceller using the traditional method.

FIG. 4 shows a traditional design of an adaptive echo canceller. As we can see, the adaptive echo canceller consists of two parts: one is the filter part and the other is the weight update part. By using a recursive algorithm (e.g., least-mean square), the coefficients of the echo canceller, ĝ, can be updated to approach the echo channel g, until the error signal e(n) is minimized Then the echo cancellation is achieved by subtracting the output of the echo canceller ŷ(n) from the received signal y(n) which is corrupted by additive white noise w(n).

Figure 5:
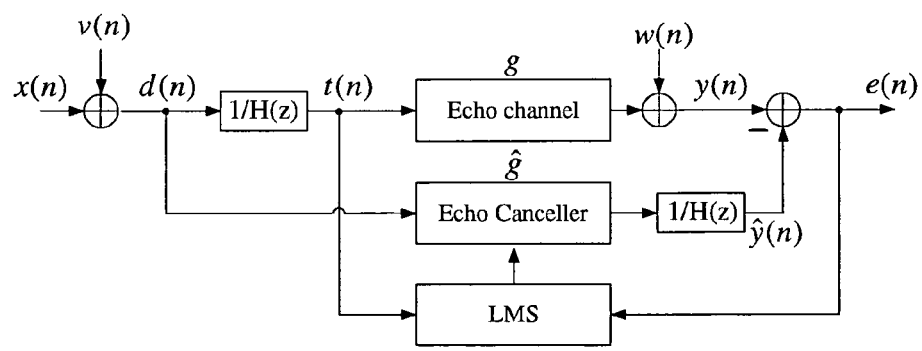
FIG. 5 illustrates a prior proposed design of an adaptive echo canceller without showing the far end transmitter part.

Direct application of the idea shown in FIG. 3 to the design of adaptive echo canceller would lead to an unacceptable performance degradation, as well as slow convergence speed. To solve these problems, a modified architecture for adaptive echo canceller was developed as shown in FIG. 5. In this figure, we see that an IIR filter, $$\frac{1}{H(z)},$$

with fixed coefficients is inserted into the echo cancellation path after the output of the echo canceller. By doing so, it can be shown that this modified design and the traditional design in FIG. 4 were mathematically equivalent. Thus, the performance of the modified design is the same as the traditional design. In addition, we note that the sum signal d(n) is used as the input to the filter part of the adaptive echo canceller instead of t(n). Thus, word-length reduction technique can be applied to reduce the hardware complexity of the filter part in the adaptive echo canceller. Since the inserted DR filter has less than 15 taps, the hardware overhead of the BR filter is negligible in practical applications.

However, the main drawback in previous invention (See, Keshab K. Parhi, and Yongru Gu, "System and method for low-power echo and NEXT cancellers", U.S. patent application Ser. No. 11/487,041, filed on Jul. 13, 2006) is that the hardware cost of the weight update part in the adaptive filter remains unchanged, which limits the overall hardware cost reduction. This is because the input to the weight update part is still t(n), which is uniform in [−M, M) such that the word-length reduction technique can not be easily applied. Thus, a new method is needed to reduce the hardware complexity of the weight update part in the adaptive filter such that the overall hardware complexity can be further reduced.

Proposed Low Complexity Adaptive Echo and NEXT Cancellers

Consider the traditional architecture of adaptive echo canceller in FIG. 4. If we insert a short FIR filter H(z) at the feed-forward cutset C denoted by dashed line in FIG. 4, we will obtain a design shown in FIG. 6. In this figure, the input to the adaptive echo canceller is changed to the sum signal d(n) rather than t(n); thus the word-length reduction technique can be applied to reduce the hardware complexity of the adaptive echo canceller. However, the design in FIG. 6 is not practical in real applications because the signal transmitted to the physical channel is also changed by inserting H(z).

Figure 6:
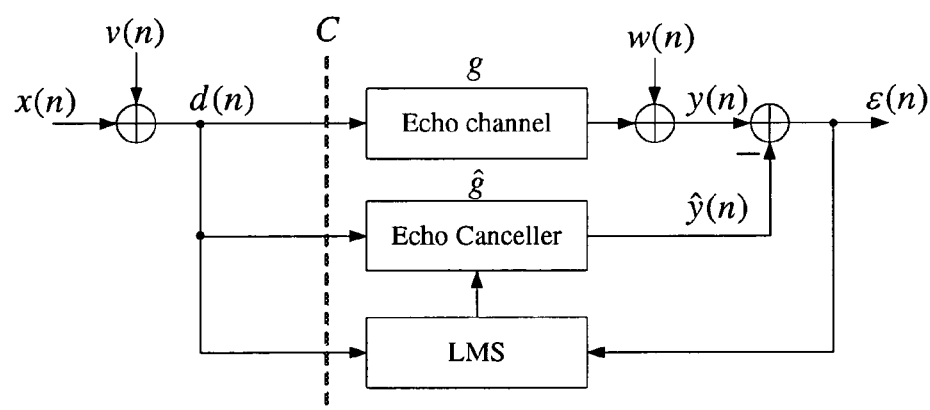
FIG. 6 illustrates a modified design of an adaptive echo canceller with input d(n).
Figure 7:
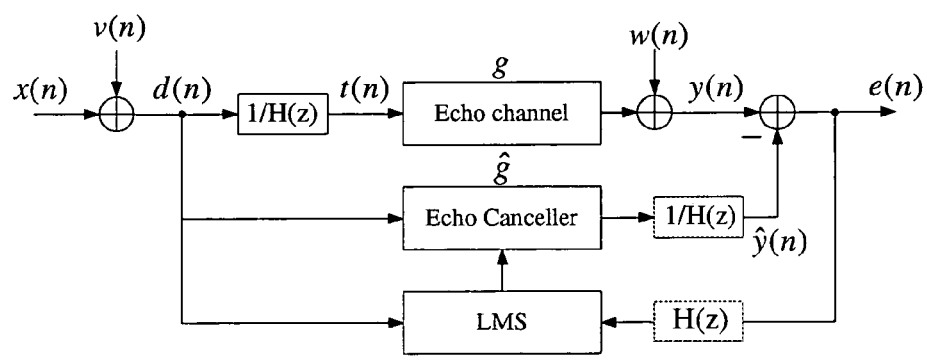
FIG. 7 illustrates the block diagram of a filtered error adaptive echo canceller.

FIG. 7 shows a proposed design by applying the retiming technique to the design in FIG. 6. From this figure, it is shown that the physical echo channel path remains the same as the traditional design in FIG. 4. In addition, the sum signal d(n) is used as the input to both filter part and weight update part of the adaptive echo canceller. Compared with the prior proposed design in FIG. 5, since the input to the weight update part of the adaptive filter is changed to d(n), the hardware complexity of the weight update part in the adaptive echo canceller can be reduced by applying the word-length reduction technique.

In order to minimize the mean square error, $E[|e(n)|^2]$ and also to track the time-varying channel environment, the LMS adaptive algorithm is applied to the proposed design. Since the update error signal e(n) is filtered before the weight update part, the resulting adaptive algorithm is usually referred as filtered error LMS algorithm (e.g., S. Shaffer and C. S. Williams, "The Filtered Error LMS Algorithm," *ICASSP* 83, vol. 8, pp. 41-44, April 1983), and it can be summarized as:

$$\hat{y}(n) = [\hat{g}(n)^H d(n)] * h^{-1}, \qquad \text{EQ.(1)}$$

$$e(n) = y(n) - \hat{y}(n), \qquad \text{EQ.(2)}$$

$$\text{EQ.(3)} \; \hat{g}(n+1) = \hat{g}(n) + \mu d(n)[e(n)*h],$$

where $\hat{g}(n)$ denotes tap weights of the adaptive echo canceller at n-th interation, d(n) is the input vector at n-th iteration, $h^{-1}$ denotes the equivalent impulse response of the IIR filter $$\frac{1}{H(z)},$$

h denotes impulse response of the FIR filter H(z), μ is the step size, and * denotes convolution operation.

Noting that d(n) is the sum of x(n) and v(n), we can write EQ.(1) as $$\hat{y}(n) = [\hat{g}(n)^H x(n) + \hat{g}(n)^H v(n)] * h^{-1}, \qquad \text{EQ.(4)}$$

which means the echo canceller in FIG. 7 can be implemented as the sum of two filters: one has the input x(n) and the other has the input v(n). In general, EQ.(4) can be rewritten as $$\hat{y}(n) = [\hat{g}_1(n)^H x(n) + \hat{g}_2(n)^H v(n)] * h^{-1}, \qquad \text{EQ.(5)}$$

where $\hat{g}_1(n)$ represents the weights of the filter with the input x(n), and $\hat{g}_2(n)$ represents the weights of the filter with the input v(n). Then the error signal e(n) can be expressed as $$e(n) = y(n) - [\hat{g}_1(n)^H x(n)]*h^{-1} - [\hat{g}_2(n)^H v(n)]*h^{-1}. \qquad \text{EQ.(6)}$$

To minimise $E[|e(n)|^2]$, modified weight update equations can be derived as:

$$\hat{g}_1(n+1) = \hat{g}_1(n) + \mu_1 x(n)[e(n)*h], \qquad \text{EQ.(7)}$$

and $$\hat{g}_2(n+1) = \hat{g}_2(n) + \mu_2 v(n)[e(n)*h], \qquad \text{EQ.(8)}$$

where $\mu_1$ and $\mu_2$ are step sizes for the corresponding adaptive filters.

Figure 8:
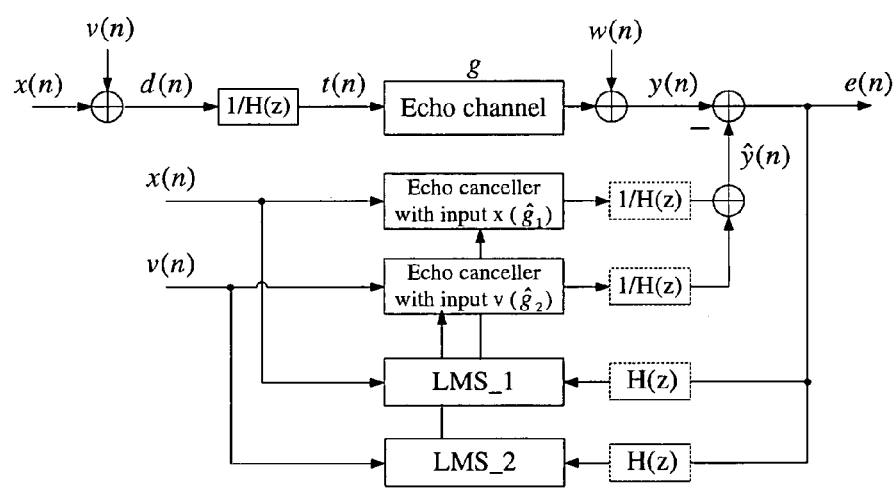
FIG. 8 illustrates the block diagram of an adaptive echo canceller with separate inputs.

From EQ.(7) and EQ.(8), it is seen that the sum of the two adaptive filters can be adapted separately with their own input signals. Based on this observation, we can obtain an architecture of the adaptive echo canceller as shown in FIG. 8. In this figure, it is seen that the adaptive echo canceller is implemented in two separate parts with the corresponding input x(n) and v(n), respectively. The correct output of the echo canceller can be obtained by adding outputs of these two separate filters. The coefficients of two filters $\hat{g}_1(n)$ and $\hat{g}_2(n)$ can be updated individually using EQ.(7) and EQ.(8).

However, it is not efficient to update both $\hat{g}_1(n)$ and $\hat{g}_2(n)$ every iteration. By observing the optimal coefficients $\hat{g}_1^{opt}$ and $\hat{g}_2^{opt}$ after convergence, it is found that both of them will converge to the same optimal value, i.e., $\hat{g}_1^{opt} = \hat{g}_2^{opt}$. This implies that only one of the equations in EQ.(7) and EQ.(8) is needed for weight updating. Based on this fact, we can use either x(n) or v(n) as the input to the weight update part in adaptive filter, and then use the updated coefficients in both filters for filtering operation. The advantage is that the hardware complexity of the weight update part can be further reduced because x(n) or v(n) can be encoded to have fewer bits than the sum signal d(n).

Figure 9:
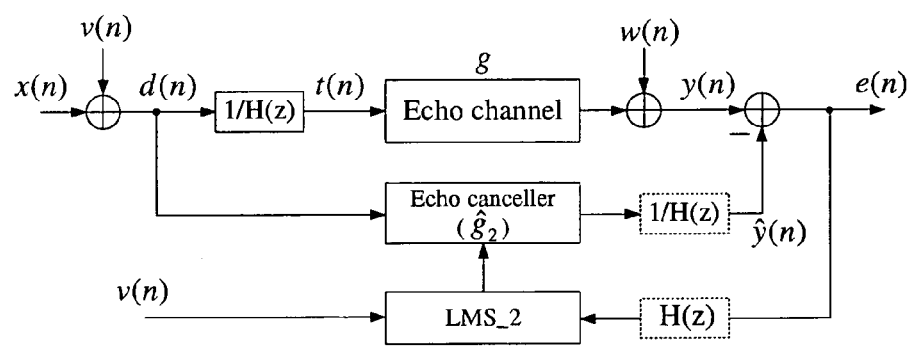
FIG. 9 illustrates the proposed adaptive echo canceller with cost-efficient weight updating schemes

By exploiting the property of the compensation signal v(n), it is found that it could be encoded to have fewer bits than x(n). If v(n) is used as the input to the weight update part, the hardware complexity can be reduced more. On the other hand, we note that v(n) dominates the eigenvalue spread of the sum signal d(n). It is better to use v(n) instead of x(n) to avoid the performance degradation. Thus, we propose to use v(n) as the input to the weight update the part in the adaptive echo canceller as shown in FIG. 9. In this figure, every iteration the coefficients are updated according to EQ.(8) with the input v(n), and then the updated coefficients are used in the filter part with the input d(n). Compared with the design in FIG. 5, the hardware complexity of weight update part can be further reduced.

Figure 10:
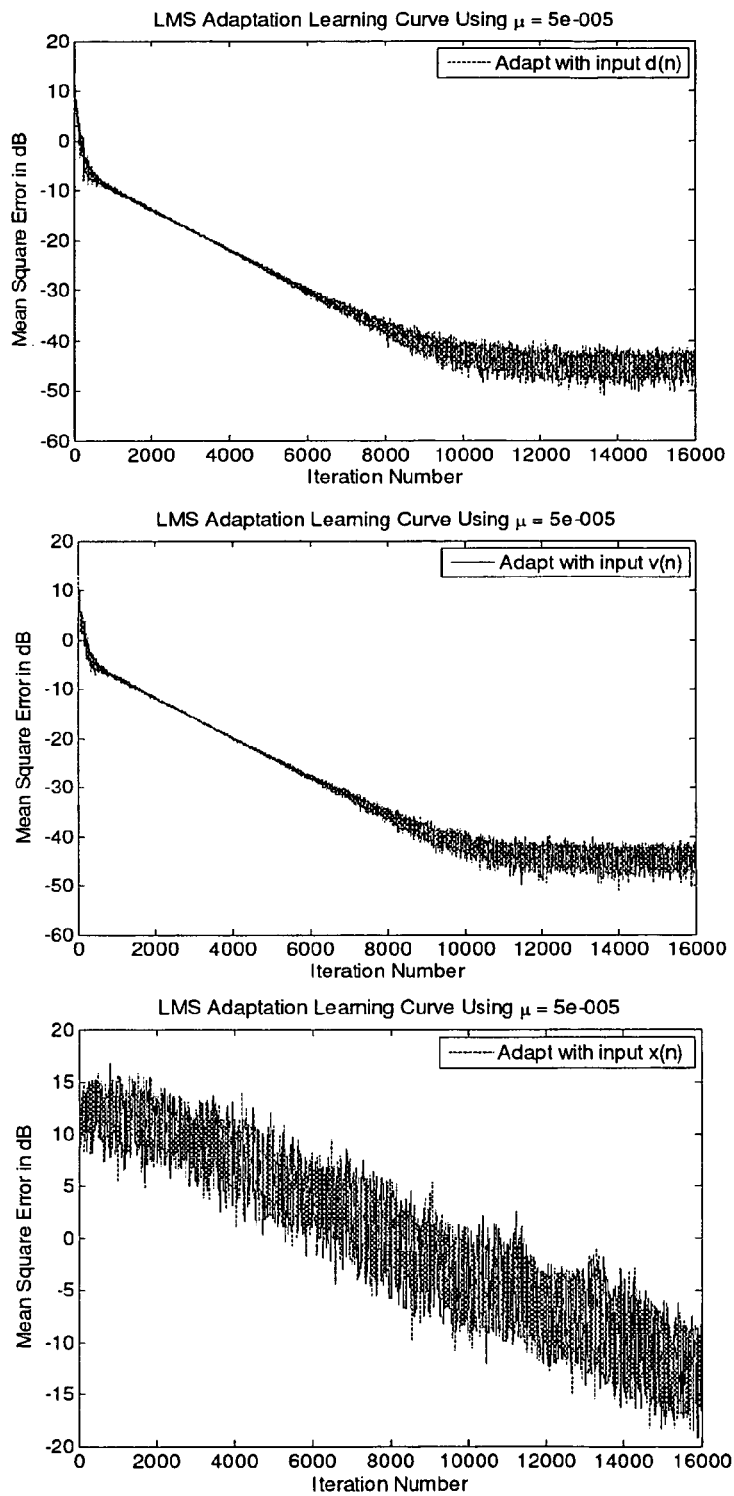
FIG. 10 shows different learning curves by applying the different input signals to the weight update part in the adaptive echo canceller.

Experimental results are provided to illustrate the performance of the proposed weight-updating scheme. In FIG. 9, x(n) is assumed to be a PAM-16 signal, and w(n) is assumed to be Gaussian White noise with zero mean and variance 0.00003. For simplicity, the echo channel is assumed to be a 5-tap FIR filter with randomly generated coefficients. In addition, the coefficients of the TH precoder corresponding to the short cable are used as the coefficients of H(z). FIG. 10 shows different learning curves by applying the different input signals to the weight update part in the adaptive echo canceller. In order to give a fair comparison, a fixed step size μ=5e−5 is used for all three cases. From the figure, it is seen that the convergence speed of the proposed weight update scheme with input v(n) is similar as the design with input d(n). By observing the mean square error (MSE) during the steady state, it is found that the performance difference is negligible. However, if using x(n) as the input to the weight update part in FIG. 9, we see that the convergence speed is slow. This is because the input statistical distribution is greatly changed by replacing d(n) using x(n) in the weight update part.

Application in a Typical 10Gbase-T System

Figure 11:
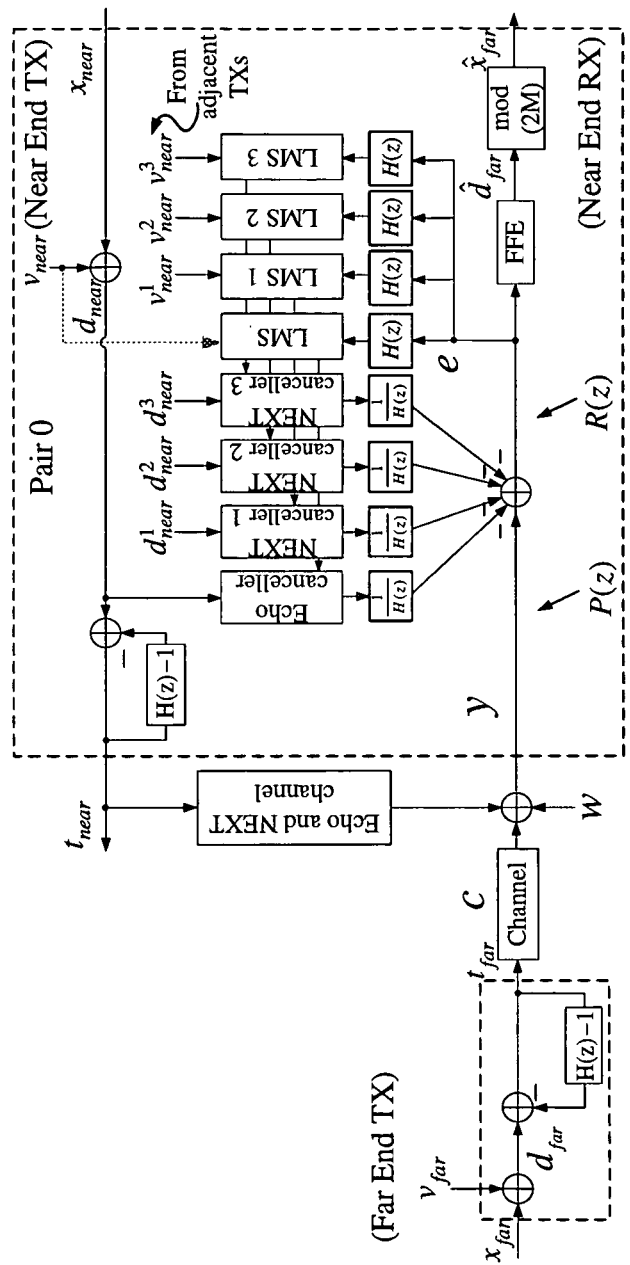
FIG. 11 illustrates the block diagram of the transceiver architecture of one pair in a 10GBase-T Ethernet system by applying the proposed weight update scheme.
Figure 12:
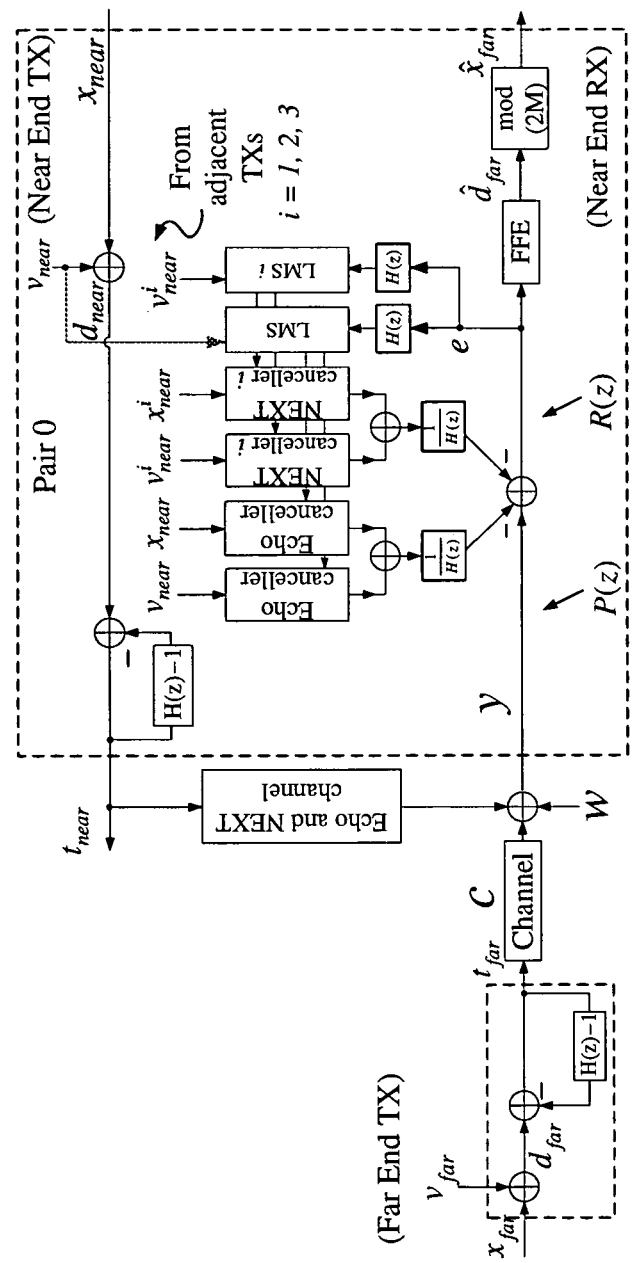
FIG. 12 illustrates the block diagram of the transceiver architecture of one pair in a 10GBase-T Ethernet system by incorporating the previous invention and the proposed weight update scheme.

It is mentioned that the proposed method is general and can be applied to adaptive NEXT cancellers as well in the application of 10GBase-T. FIG. 11 provides a design example of applying the proposed method to a typical 10GBase-T system with TH precoding. It should be noted that the design architecture provided here is one implementation of the proposed adaptive echo and NEXT cancellers in a typical 10GBase-T system using TH precoders. Other embodiments not shown here can be derived by a person skilled in the relevant art by using the main ideas of this invention.

Next, fixed point simulation results are presented to evaluate the system performance in terms of the residual error signal power by applying the proposed scheme. In addition, the hardware complexity analysis is presented to demonstrate the complexity reduction of the proposed adaptive echo and NEXT cancellers in a typical 10GBase-T system.

The simulation is performed under Cat-6 unshielded twisted-pair (UTP) channel environment. The measured data of channel models with different lengths can be obtained from the IEEE 802.3an website. A PAM-2 signal is used as the training signal while data symbol is assumed to be PAM-16. In addition, the transmit power is assumed to be 5 dBm, AWGN power is assumed to be −150 dBm. It is also assumed that the number of taps in each echo canceller is 500, the number of taps in each NEXT canceller is 300, the number of taps in each TH precoder is 13, and the number of taps in each feed-forward equalizer (FFE) is 64.

Table 1 shows the performance comparison in terms of residual error signal power at the input to the FFE. In the simulation, we evaluate the proposed design over Cat-6 measured channel models with different lengths: 100 m, 75 m, and 55 m respectively. As we can see from this table, the proposed design has around 1.5 dB performance penalty compared with the traditional design and proposed design in previous invention (See, Keshab K. Parhi, and Yongru Gu, "System and method for low-power echo and NEXT cancellers", U.S. patent application Ser. No. 11/487,041, filed on Jul. 13, 2006).

To evaluate the hardware cost of the proposed design, we use XOR2 ($C_{xor}$), 1-bit D flip-flop ($C_{reg}$), and basic 2-input gates ($C_{gate}$) such as NAND2, NOR2, to represent the total cost of the adaptive echo and NEXT cancellers, where $C_{xor}$, $C_{reg}$, and $C_{gate}$ are technology dependent constants. For example, a one-bit fulladder can be represented as $C_{fa}=2\times C_{xor}+3\times C_{gate}$. Furthermore, we assume $C_{gate}=1$, $C_{xor}=1.75$, and $C_{reg}=5.5$.

Table 2 shows the hardware complexity comparison of the resulting adaptive echo and NEXT cancellers by applying different architectures. From this table, it is seers that the proposed architecture can save the hardware cost of total adaptive cancellers about 42.02%, while the previous invention (See, Keshab K. Parhi, and Yongru Gu, "System and method for low-power echo and NEXT cancellers", U.S. patent application Ser. No. 11/487,041, filed on Jul. 13, 2006) can only save about 10.08%. The further cost reduction is mainly due to the efficient weight-updating scheme such that word-length of the input signal to the weight update part can be significantly reduced. As we can see from the table, the hardware cost of the weight update part in both echo and NEXT cancellers has been greatly reduced in the proposed architecture.

CONCLUSIONS

A new method to further reduce the hardware cost of adaptive echo and NEXT cancellers is presented, and the proposed method can be used to design a low complexity transceiver in high-speed multi-channel wireline communication systems with TH precoders, such as 10GBase-T. It is shown that the proposed method can reduce the hardware cost by about 42.02% only with about 1.5 dB performance penalty, compared with the traditional design.

It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

TABLE 1

| Measured Cat-6 UTP Cable | Residual noise level at the input to the FFE (dB) | | |
|---|---|---|---|
| | Traditional Design FIG. 1 | Design in Previous Invention FIG. 5 | Proposed Design FIG. 11 |
| 100 m | −63.25 | −63.28 | −61.71 |
| 75 m | −63.28 | −63.36 | −62.16 |
| 55 m | −63.27 | −63.27 | −62.17 |

TABLE 2

| | Traditional Design FIG. 1 | Design in Previous Invention FIG. 5 | Proposed Design FIG. 11 |
|---|---|---|---|
| Echo canceller (filter part) | 560354 | 320268.5 | 320268.5 |
| Echo canceller (update part) | 545000 | 545000 | 145250 |
| NEXT canceller (filter part) | 1008644 | 576387.5 | 576387.5 |
| NEXT canceller (update part) | 981000 | 981000 | 261450 |
| Overhead | 0 | 337339.5 | 491269.5 |
| Cost for one pair | 3094998 | 2759995.5 | 1794625.5 |
| Total cost (×4) | 12379992 | 11039982 | 7178502 |
| Saving | -/- | 10.82% | 42.02% |

What is claimed is:

1. A communications transceiver comprising:
   i. N transmitters, where N is a positive integer, each containing a precoder to process an input signal and compute a compensation signal;
   ii. N receivers, each comprising:
   (a) a first filter used as an echo canceller, coupled to a sum of the input signal and the compensation signal of the precoder of the corresponding transmitter;
   (b) a weight update block, coupled to either the compensation signal or the input signal of the precoder of the corresponding transmitter or the sum of these two signals, to compute a set of tap weights for the corresponding echo canceller;
   (c) a second filter with transfer function 1/H(z), coupled to the output of the echo canceller;
   (d) computing the difference between the output of the second filter and the received signal to generate an error signal;
   (e) filtering the error signal by a third filter H(z), whose transfer function is the reciprocal of that of the second filter, and using the output of the third filter as an input to the weight update block.

2. The transceiver in claim 1, where each Echo canceller is implemented using two Echo cancellers, one canceller coupled to the input signal of the precoder, and another coupled to the compensation signal of the precoder, where each of the two cancellers uses the same tap weights computed by the weight update block.

3. The transceiver in claim 1 used as a 10GBase-T transceiver.

4. The transceiver in claim 1 used as an Ethernet transceiver.

5. A communications transceiver comprising:
   i. N transmitters, where N is a positive integer greater than 1, each containing a precoder to process an input signal and compute a compensation signal;
   ii. N receivers, each comprising:
   (a) a first filter used as a NEXT canceller, to filter a sum of the input signal and the compensation signal of the precoder of a near-end transmitter;
   (b) a weight update block to compute a set of tap weights for the NEXT canceller, coupled to either the compensation signal or the input signal of the precoder of the corresponding near-end transmitter or to the sum of these two signals;
   (c) a second filter with transfer function 1/H(z), coupled to the output of the NEXT canceller;
   (d) computing the difference between the output of the second filter and the received signal to generate an error signal;
   (e) filtering the error signal by a third filter H(z), whose transfer function is the reciprocal of that of the second filter, and using the output of the third filter as an input to the corresponding weight update block.

6. The transceiver in claim 1, where each NEXT canceller is implemented using two NEXT cancellers, one canceller coupled to a near-end precoder's input signal, and another coupled to the near-end precoder's compensation signal, where each of the two NEXT cancellers uses the same tap weights computed by the weight update block.

7. The transceiver in claim 5 used as a 10GBase-T transceiver.

8. The transceiver in claim 1 used as an Ethernet transceiver.

9. An integrated circuit implementing a communications transceiver comprising:
   i. N transmitters, where N is a positive integer, each containing a precoder to process an input signal and compute a compensation signal;
   ii. N receivers, each comprising:
   (a) a first filter used as an echo canceller, to filter a sum of the input signal and the compensation signal of the precoder of the corresponding transmitter;
   (b) a weight update block, coupled to either the compensation signal or the input signal of the precoder of the corresponding transmitter or the sum of these two signals;
   (c) a second filter with transfer function 1/H(z), coupled to the output of the echo canceller;
   (d) a subtractor to compute the difference between the output of the second filter and the received signal to generate an error signal;
   (e) a third filter H(z), whose transfer function is reciprocal of that of the second filter, to filter the error signal and using the output of the this filter as an input to the corresponding weight update block.

10. The transceiver in claim 9, where each echo canceller is implemented using two Echo cancellers, one canceller coupled to an input signal of the precoder, and another coupled to its compensation signal of the precoder, where the tap weights for each of these two cancellers are computed by the same weight update block.

11. The transceiver in claim 9 where the precoder is a Tomlinson-Harashima precoder.

12. The transceiver in claim 9 used as an ethernet transceiver.

13. The transceiver in claim 9 used as a 10GBase-T transceiver.

14. An integrated circuit implementing a communications transceiver comprising:
   i. N transmitters, where N is a positive integer greater than 1, each containing a precoder to process an input signal and compute a compensation signal;
   ii. N receivers, each comprising:
   (a) a first filter used as a NEXT canceller, to filter a sum of the input signal and the compensation signal of the precoder of a corresponding near-end transmitter;
   (b) a weight update block, coupled to either the compensation signal or the input signal of the precoder of the corresponding near-end transmitter or the sum of these two signals;
   (c) a second filter with transfer function 1/H(z), coupled to the output of the NEXT canceller;
   (d) a subtractor to compute the difference between the output of the second filter and the received signal to generate an error signal;
   (e) a third filter H(z), whose transfer function is reciprocal of that of the second filter, to filter the error signal and using the output of the this filter as an input to the corresponding weight update block.

15. The transceiver in claim 14, where each NEXT canceller is implemented using two NEXT cancellers, one canceller coupled to a near-end precoder's input signal, and another coupled its compensation signal, where the tap weights for each of these two cancellers are computed by the same weight update block.

16. The transceiver in claim 14 where the precoder is a Tomlinson-Harashima precoder.

17. The transceiver in claim 14 used as an ethernet transceiver.

18. The transceiver in claim 14 used as a 10GBase-T transceiver.

19. An echo canceller in a precoded communications transceiver, comprising:
a transmitter, comprising a precoder, to process an input signal and compute a compensation signal;
a receiver comprising:
a received signal;
a first filter loop comprising: a first filter, with a transfer function H(z), to filter a first error signal;
a second filter coupled to the output of the first error signal to compute a set of tap weights;
a third filter to filter a sum of the compensation signal and the input signal of the precoder of the transmitter using the tap weights computed by the second filter; and
a fourth filter with transfer function 1/H(z), the reciprocal of that of the first filter, to filter the output of the third filter;
where the first error signal is computed by taking a difference of the received signal and the output of the fourth filter.

20. The echo canceller in claim 19 where the second filter is further coupled to either the compensation signal or the input signal of the precoder of the transmitter.

21. The echo canceller in claim 19 where the second filter is further coupled to a sum of the input signal and the compensation signal of the precoder of the transmitter.

22. The echo canceller in claim 19 where the third filter is replaced by a fifth filter to filter the compensation signal of the precoder, and a sixth filter to filter the input signal of the precoder.

23. The echo canceller in claim 22 where the tap weights computed by the weight update block are used by both fifth and sixth filters.

24. The echo canceller in claim 19 used in an Ethernet transceiver.

25. The echo canceller in claim 19 used in an Ethernet transceiver over copper.

26. The echo canceller in claim 19 used in a multi-input multi-output transceiver.

27. The echo canceller in claim 19 used in a 10GBase-T transceiver.

28. The echo canceller in claim 19 used in a transceiver over multi-pair cable.

29. The echo canceller in claim 19 implemented by an integrated circuit.

30. A near-end cross-talk canceller in a multiple-input multiple-output precoded communication transceiver, comprising:
a first transmitter, comprising a first precoder, to process a first input signal and compute a first compensation signal;
a second transmitter, comprising a second precoder, to process a second input signal and compute a second compensation signal;
a first receiver comprising a first received signal; and a second receiver comprising a second received signal;
the first receiver further comprising: a first loop comprising: a first filter, with a transfer function H(z), to filter a first error signal;
a second filter coupled to the output of the first error signal to compute a set of tap weights;
a third filter to filter a sum of the compensation signal and the input signal of the second precoder of the second transmitter using the tap weights computed by the second filter; and
a fourth filter with a transfer function 1/H(z), the reciprocal of that of the first filter, to filter the output of the third filter;
where the first error is computed by taking the difference of the first received signal and the output of the fourth filter.

31. The near-end canceller in claim 30 where the second filter is further coupled to the compensation signal or the input signal of the second precoder of the second transmitter.

32. The near-end canceller in claim 30 where the second filter is further coupled to a sum of the input signal and the compensation signal of the second precoder of the second transmitter.

33. The near-end canceller in claim 30 where the third filter is replaced by a fifth filter to filter the second compensation signal of the second precoder, and a sixth filter to filter the second input signal of the second precoder.

34. The near-end canceller in claim 33 where the tap weights computed by the weight update block are used by both fifth and sixth filters.

35. The near-end canceller in claim 30 used in an Ethernet transceiver.

36. The near-end canceller in claim 30 used in a 10GBase-T transceiver.

37. The near-end canceller in claim 30 used in a transceiver over multi-pair cable.

38. The near-end canceller in claim 30 used in an Ethernet transceiver over copper.

39. The near-end canceller in claim 30 implemented by an integrated circuit.

* * * * *